United States Patent
Horiguchi et al.

(10) Patent No.: US 10,717,864 B2
(45) Date of Patent: Jul. 21, 2020

(54) POLYACETAL RESIN COMPOSITION FOR MOLDING PLATE-SHAPED MOLDED ARTICLE, PLATE-SHAPED MOLDED ARTICLE, AND CARRIER PLATE OF WINDOW REGULATOR

(71) Applicant: Polyplastics Co., Ltd., Tokyo (JP)

(72) Inventors: Tadahiro Horiguchi, Fuji (JP); Sonae Kotani, Fuji (JP); Kazuki Ohi, Fuji (JP)

(73) Assignee: POLYPLASTICS CO., LTD., Tokyo (JP)

(*) Notice: Subject to any disclaimer, the term of this patent is extended or adjusted under 35 U.S.C. 154(b) by 0 days.

(21) Appl. No.: 16/301,565

(22) PCT Filed: Apr. 12, 2017

(86) PCT No.: PCT/JP2017/015017
§ 371 (c)(1),
(2) Date: Nov. 14, 2018

(87) PCT Pub. No.: WO2018/003233
PCT Pub. Date: Jan. 4, 2018

(65) Prior Publication Data
US 2019/0309158 A1  Oct. 10, 2019

(30) Foreign Application Priority Data

Jun. 30, 2016 (JP) ................ 2016-129981

(51) Int. Cl.
*C08L 59/02* (2006.01)
*B60J 10/74* (2016.01)
*B29C 45/00* (2006.01)
*B60J 1/00* (2006.01)
*C08J 5/00* (2006.01)
*C08L 59/00* (2006.01)
*C08K 5/13* (2006.01)
*B29K 59/00* (2006.01)
*B60J 1/17* (2006.01)

(52) U.S. Cl.
CPC ............ *C08L 59/02* (2013.01); *B29C 45/00* (2013.01); *B29C 45/0001* (2013.01); *B60J 1/004* (2013.01); *B60J 10/74* (2016.02); *C08J 5/00* (2013.01); *C08K 5/13* (2013.01); *C08L 59/00* (2013.01); *B29K 2059/00* (2013.01); *B60J 1/17* (2013.01)

(58) Field of Classification Search
CPC . B29C 45/00; B29C 45/0001; B29K 2059/00; B60J 1/004; B60J 1/17; B60J 10/74; C08J 5/00; C08K 5/13; C08L 59/00; C08L 59/02
See application file for complete search history.

(56) References Cited

U.S. PATENT DOCUMENTS

| | | | | |
|---|---|---|---|---|
| 3,980,734 A | * | 9/1976 | Burg | C08L 59/02 525/110 |
| 5,929,195 A | * | 7/1999 | Kawaguchi | C08G 2/22 528/233 |
| 2003/0036591 A1 | * | 2/2003 | Harashina | C08K 5/34926 524/91 |
| 2004/0138357 A1 | * | 7/2004 | Chin | C08K 5/1345 524/287 |
| 2005/0182200 A1 | | 8/2005 | Kawaguchi et al. | |
| 2007/0073007 A1 | | 3/2007 | Harashina | |

FOREIGN PATENT DOCUMENTS

| | | |
|---|---|---|
| JP | 2003-342442 | 12/2003 |
| JP | 2004-314819 | 11/2004 |
| JP | 2005-050441 | 2/2005 |
| JP | 2014-148626 | 8/2014 |
| WO | WO 2005/044917 | 5/2005 |

* cited by examiner

*Primary Examiner* — Christopher M Rodd
(74) *Attorney, Agent, or Firm* — Knobbe, Martens, Olson & Bear, LLP (57) ABSTRACT

A polyacetal resin composition suitable for providing a plate-shaped resin molded article that satisfies all of the following: high flatness, low shrinkage ratio anisotropy (high dimensional stability), high creep resistance, high impact strength, and excellent color stability during residence in the molding machine. The polyacetal resin composition for molding a plate-shaped molded article includes 100 mass parts of a polyacetal resin having a melt index (according to ASTM D1238, 190° C., 2.16 kgf) of 2.0 g/10 min to 4.0 g/10 min; 0.1 mass parts to 2 mass parts of a polyacetal copolymer that is a copolymer of (b1) trioxane, (b2) a compound having two to four cyclic ether units per one molecule, and (b3) a compound having one cyclic ether unit per one molecule, the polyacetal copolymer having a branched or crosslinked structure; and 0.1 mass parts to 1 mass part of a hindered phenol antioxidant.

10 Claims, 2 Drawing Sheets

POLYACETAL RESIN COMPOSITION FOR MOLDING PLATE-SHAPED MOLDED ARTICLE, PLATE-SHAPED MOLDED ARTICLE, AND CARRIER PLATE OF WINDOW REGULATOR

RELATED APPLICATIONS

This application is the U.S. National Phase under 35 U.S.C. § 371 of International Application PCT/JP2017/015017, filed Apr. 12, 2017, designating the U.S., and published in Japanese as WO 2018/003233 on Jan. 4, 2018, which claims priority to Japanese Patent Application No. 2016-129981, filed Jun. 30, 2016, the entire contents of which are incorporated herein by reference.

TECHNICAL FIELD

The present invention relates to a polyacetal resin composition for molding a plate-shaped molded article, a plate-shaped molded article, and a carrier plate for a window regulator.

BACKGROUND ART

Currently, in doors of many automobiles, so-called power windows are adopted. A power window is provided with a window regulator which raises and lowers a window glass by electric power, and a window regulator is constituted by comprising a carrier plate which holds the window glass, and a guide rail which extends in a raising and lowering (up and down) direction, and which moves the carrier plate in a raising and lowering (up and down) direction by the operation of a motor.

It is preferable for the carrier plate to be made of resin, because it is possible to attempt to design for mass reduction of the vehicle, and to increase cost efficiency. Among these, it is preferable for the carrier plate to be made of a polyacetal (POM) resin, because it is excellent in mechanical characteristics, thermal characteristics, slidability, moldability, and the like.

Patent Document 1 discloses a carrier plate made of polyacetal resin reinforced by a thickened reinforcing portion or the like, constituted by comprising a plate-shaped main body, and a reinforcing portion.

Incidentally, the carrier plate is mounted in a space between a door outer panel and a door inner panel in a door main body constituted by comprising a door outer panel and a door inner panel. The volume of this space is limited, moreover, members other than the carrier plate are also accommodated in this space. In addition, the carrier plate is a relatively large resin molded article, occupying a length of about 10 cm in both the longitudinal and transverse directions.

Hence, when molding a plate-shaped molded article from a polyacetal resin composition, there is demand for increasing the flatness of the resin molded article, such that it can be suitably accommodated in a limited space without interfering with other members, and increasing the dimensional stability while suppressing shrinkage ratio anisotropy due to molding as much as possible. Furthermore, in addition to creep resistance and impact strength, from the viewpoint of the quality consistency of the molded article when molding, there is high demand for color stability when remaining in the molding machine. If the color is unstable when remaining in the molding machine, molding condition dependency arises, whereby it may not be possible to consistently maintain a stable product quality.

Patent Document 1: Japanese Unexamined Patent Application, First Publication No. 2004-314819

DISCLOSURE OF THE INVENTION

Problems to be Solved by the Invention

However, until now there has been no disclosure of a composition which can satisfy all of the above described high demands relating to a plate-shaped molded body.

The objective of the present invention is to provide a polyacetal resin composition suitable for providing a plate-shaped resin molded article which satisfies all of high flatness, low shrinkage ratio anisotropy (high dimensional stability), high creep resistance, high impact strength, and excellent color stability when remaining in the molding machine.

Means for Solving the Problems

The present inventors, as a result of diligent research in order to achieve the above mentioned objective, discovered that the above mentioned objective can be achieved by blending a specified copolymer as a nucleating agent with respect to a polyacetal resin which has a melt index within a specified range, and thereby completed the present invention. More specifically, the present invention provides the following.

(1) The present invention is a polyacetal resin composition for molding a plate-shaped molded article, comprising (A) 100 parts by mass of a polyacetal resin having a melt index (according to ASTM-D1238, 190° C., 2.16 kgf) of 2.0 g/10 min to 4.0 g/10 min, (B) 0.1 parts by mass to 2 parts by mass of a polyacetal copolymer having a branched or crosslinked structure, which is a copolymer of (b1) trioxane, (b2) a compound having 2 to 4 cyclic ether units per one molecule, and (b3) a compound having one cyclic ether unit per one molecule, and (C) 0.1 parts by mass to 1 part by mass of a hindered phenol-based antioxidant.

(2) Or, the present invention is a polyacetal resin composition according to (1), wherein the hindered phenol-based antioxidant (C) comprises ethylene bis(oxyethylene) bis[3-(3-t-butyl-4-hydroxy-5-methylphenyl)propionic acid].

(3) Or, the present invention is a polyacetal resin composition according to (1) or (2), wherein the flatness measured according to the measurement method below is 1.5 mm or less.

(Measurement Method of the Flatness)

(I) A plate-shaped molded article is obtained by injection molding of the polyacetal resin composition under conditions of a cylinder temperature of 200° C., mold temperature of 80° C., holding pressure 50 MPa, injection rate 30 mm/s, one point center pin gate, having a flat plate portion and a rib portion, a length of the long side of the flat plate portion is 98 mm, a length of the short side of the flat plate portion is 48 mm, a thickness of the flat plate portion is 2 mm, a rib thickness of the rib portion is 4 mm, and a rib height of the rib portion is 6 mm.

(II) For the plate-shaped molded article obtained in (I), 4 locations each 5 mm away in the long side direction and the short side direction from the four corners of the flat plate portion towards the inner side of the flat plate portion are taken as end points.

(III) From the end points of the 4 locations, a total of 35 locations are set as measurement positions, by selecting 7 locations in the long side direction of the flat plate portion and 5 locations in the short side direction of the flat plate portion such that the distances between each point are evenly spaced.

(IV) For each of the 35 locations of the measurement positions, the degree of deviation from the base surface of the flat plate portion was measured using an image measuring device, and the magnitude of the difference between the greatest positive deviation point and the greatest negative deviation point was taken as the flatness.

(4) Or, the present invention is a plate-shaped molded article consisting of the polyacetal resin composition according to any one of (1) to (3).

(5) Or, the present invention is a carrier plate of a window regulator, constituted by comprising the plate-shaped molded article according to (4).

Effects of the Invention

According to the present invention, it is possible to provide a polyacetal resin composition suitable for providing a plate-shaped resin molded article which satisfies all of high flatness, low shrinkage ratio anisotropy (high dimensional stability), high creep resistance, high impact strength, and excellent color stability when remaining in the molding machine.

PREFERRED MODE FOR CARRYING OUT THE INVENTION

Below, specific embodiments of the invention are explained in detail, but the present invention is not limited in any way by the below embodiments, and the present invention may be implemented with the addition of suitable modifications within the scope of the objective of the invention.
<Polyacetal Resin Composition>

The polyacetal resin composition according to the present invention comprises (A) 100 parts by mass of a polyacetal resin with a melt index of 2.0 g/10 min to 4.0 g/10 min, (B) 0.1 parts by mass to 2 parts by mass of a specified nucleating agent, and (C) 0.1 to 1 part by mass of a hindered phenol-based antioxidant. The (B) specified nucleating agent is a polyacetal copolymer having a branched or crosslinked structure, and is a copolymer of (b1) trioxane, (b2) a compound having 2 to 4 cyclic ether units per one molecule, and (b3) a compound having one cyclic ether unit per one molecule.
[(A) Polyacetal Resin]

The (A) polyacetal resin has a melt index of 2.0 g/10 min to 4.0 g/10 min. In the case that the melt index is too large, the creep resistance and impact strength of the molded article made from the resin composition will be low, and in the case that it is too small, undesirable effects for the moldability will arise, and it will become difficult to obtain a plate-shaped resin molded article having the desired excellent flatness, and low shrinkage ratio anisotropy (high dimensional stability). The melt index is a value measured under the conditions of 190° C., 2.16 kgf (21.2 N) according to ASTM-D1238.

The (A) polyacetal resin is a polymer compound whose main constituent units are oxymethylene ($-OCH_2-$), and representative resins are polyacetal homopolymers substantially consisting only of repeating units of oxymethylene, or polyacetal copolymers comprising comonomer units other than the oxymethylene units. Further, the polyacetal resin may also include a copolymer in which a branched or crosslinked structure has been introduced by copolymerizing with a branch-forming component or a crosslink-forming component, or a block copolymer or a graft copolymer having polymer units other than the polymer units consisting of the oxymethylene group repeating units. These polyacetal resins may be used individually or in combinations of 2 or more.

Generally, a polyacetal homopolymer is produced by polymerizing an anhydrous formaldehyde or trioxane (cyclic trimer of formaldehyde), and usually, the terminals thereof are stabilized with respect to thermal decomposition by esterification.

In contrast, a polyacetal copolymer is generally produced by copolymerizing formaldehyde or a cyclic oligomer of formaldehyde (for example, trioxane) represented by the general formula $(CH_2O)_n$ (in the formula, n is an integer of 3 or more), and a comonomer such as a cyclic ether or a cyclic formal or the like, and usually, it is stabilized with respect to thermal decomposition by eliminating the unstable portions of the terminals by hydrolysis.

As the main raw material of the polyacetal copolymer, trioxane or tetraoxane or the like may be mentioned, and usually, trioxane is used.

The comonomer may include a cyclic ether, glycidyl ether compound, cyclic formal, cyclic ester (for example, β-propiolactone or the like), vinyl compound (for example, styrene, vinyl ether or the like) or the like.

As the cyclic ether, for example, ethylene oxide, propylene oxide, butylene oxide, cyclohexene oxide, epichlorohydrin, epibromohydrin, styrene oxide, oxetane, 3,3-bis(chloromethyl)oxetane, tetrahydrofuran, and the like may be mentioned.

As the glycidyl ether compound, for example, an aklyl or aryl glycidyl ether (for example, methyl glycidyl ether, ethyl glycidyl ether, phenyl glycidyl ether, naphthyl glycidyl ether and the like), alkylene or polyalkylene glycol glycidyl ether (for example, ethylene glycol diclycidyl ether, triethylene glycol diglycidyl ether, butanediol diglycidyl ether, and the like), alkyl or aryl glycidyl alcohol or the like may be mentioned.

As the cyclic formal, for example, 1,3-dioxolane, propylene glycol formal, diethylene glycol formal, triethylene glycol formal, 1,4-butanediol formal, 1,5-pentanediol formal, 1,6-hexanediol formal, trioxepane, and the like may be mentioned.

These comonomers may be used individually, or may be used in combinations of two or more. Among these comonomers, usually, cyclic ether and/or cyclic formal is used, and in particular, a cyclic ether such as ethylene oxide or the like, or a cyclic formal such as 1,3-dioxolane, 1,4-butanediol formal, diethylene glycol formal or the like is preferable.

The proportions of these comonomer (for example, cyclic ether and/or cyclic formal) units are not particularly limited, but are generally in the range of 0.1 mass % to 20 mass %, with respect to the total polyacetal resin, preferably on the order of 0.5 mass % to 20 mass %, and more preferably 0.5 mass % to 15 mass % (especially 1 mass % to 10 mass %).

The polyacetal resin of the (A) component used in the present invention preferably has an unstable terminal group amount of 0.5 mass % or less. This unstable terminal group amount shows the amount of portions present at the terminal portions of the polyacetal copolymer, which are unstable and readily decomposed with respect to heat or bases. This unstable terminal group amount is shown as a mass % with respect to the polyacetal copolymer, by charging 1 g of the polyacetal copolymer, along with 100 ml of a 50% (volume %) methanol aqueous solution comprising 0.5% (volume %) ammonium hydroxide in the closed vessel of pressure-resistance, and after heat treatment for 45 min at 180° C., cooling, and opening, and measuring the formaldehyde amount decomposed and eluted in the obtained solution.

If the polyacetal resin of the (A) component is not one which has the above describe terminal characteristics, in the case that the upper limit value is exceeded, it becomes difficult to obtain a polyacetal resin composition with a low formaldehyde generation amount. From such a viewpoint, the polyacetal resin of the (A) component preferably has an unstable terminal group amount of 0.5 mass % or less, more preferably 0.3 mass % or less. On the other hand, the lower limit of the unstable terminal group amount is not particularly limited.

[Specified Nucleating Agent]

The polyacetal resin composition of the present invention comprises a specified nucleating agent (B). The specified nucleating agent (B) is a copolymer of (b1) trioxane, (b2) a compound having 2 to 4 cyclic ether units per one molecule, and (b3) a compound having one cyclic ether unit per one molecule, and is a polyacetal resin composition (below referred to as "copolymer of (b1), (b2), and (b3)") having a branched or crosslinked structure. This specified nucleating agent (B), along with increasing the crystallization degree of the polyacetal resin composition, has the function of forming a fine crystal structure. In particular, the specified nucleating agent (B) has a high crystallization promotion ability, whereby it is possible to mold a plate-shaped resin molded article having excellent flatness, low shrinkage ratio anisotropy (high dimensional stability), and excellent creep resistance.

The contents of the copolymer of (b1), (b2) and (b3) is 0.1 parts by mass to 2 parts by mass with respect to 100 parts by mass of the (A) polyacetal resin, more preferably 0.5 parts by mass to 1 part by mass. If the content of the copolymer of (b1), (b2) and (b3) is too small, the flatness or the reduction of the shrinkage ratio anisotropy of the plate-shaped resin molded article will be insufficient, which is undesirable. If the content of the copolymer of (b1), (b2) and (b3) is too large, undesirable effects will arise for the moldability of the resin composition, and the mechanical characteristics such as the hardness, strength and the like of the plate-shaped resin molded article may decrease and be insufficient.

[(b1) Trioxane]

The (b1) trioxane is a cyclic trimer of formaldehyde, and is the same as the trioxane explained for the (A) component. The (b1) trioxane is obtained by reacting a formaldehyde aqueous solution under the presence of an acidic catalyst, and is used after purifying the same by a method such as distillation or the like. The trioxane used for the polymerization is preferably as free as possible of impurities such as water, methanol, formic acid, and the like.

[(b2) Compound Having 2 to 4 Cyclic Ether Units Per One Molecule]

The (b2) compound having 2 to 4 cyclic ether units per one molecule, is a generic name of a compound having 2 to 4 cyclic ether units selected from the group consisting of epoxy unit, glycidyl unit, 1,3-dioxolane unit, 1,4-butanediol formal unit, diethylene glycol formal unit, 1,3,6-trioxepane unit, and the like per one molecule. As the cyclic ether unit, glycidyl unit is preferable, and triglycidyl ether compound and tetraglycidyl ether compound are preferable as the compound.

As examples thereof, ethylene glycol diglycidyl ether, propylene glycol diglycidyl ether, 1,4-butanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerol triglycidyl ether, trimethylol propane triglycidyl ether, pentaerythritol tetraglycidyl ether and the like may be mentioned.

Especially, ethylene glycol diglycidyl ether, propylene glycol diglycidyl ether, 1,4-butanediol diglycidyl ether, hexamethylene glycol diglycidyl ether, glycerol triglycidyl ether, trimethylol propane triglycidyl ether, pentaerythritol tetraglycidyl ether and the like, which are aliphatic-based compounds, are preferable. These compounds may be used individually, or two or more may be supplied in combination for copolymerization with the trioxane (b1).

The copolymerized amount of the (b2) compound having 2 to 4 cyclic ether units per one molecule is 0.0005 parts by mass to 2 parts by mass with respect to 100 parts by mass of the (b1) trioxane, preferably 0.001 parts by mass to 1.5 parts by mass, more preferably 0.005 parts by mass to 1 parts by mass. If the copolymerization amount of the (c2) component is too small, it becomes difficult to obtain a plate-shaped resin molded article having the desired flatness, low shrinkage ratio anisotropy (high dimensional stability), and creep resistance, and on the contrary, if too large, problems with the moldability may arise due to the reduction of flowability.

[(b3) Compound Having One Cyclic Ether Unit Per One Molecule]

As the (b3) compound having one cyclic ether unit per one molecule, ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, ethylene glycol formal, propylene glycol formal, diethylene glycol formal, triethylene glycol formal, 1,4-butanediol formal, 1,5-pentanediol formal, 1,6-hexanediol formal, and the like may be mentioned. Among these, ethylene oxide, 1,3-dioxolane, 1,4-butanediol formal, and diethylene glycol formal are preferable.

The copolymerization amount of the (b3) compound having one cyclic ester unit per molecule is 0 parts by mass to 20 parts by mass with respect to 100 parts by mass of the (b1) trioxane, preferably 0.05 parts by mass to 15 parts by mass, more preferably 0.1 parts by mass to 10 parts by mass. If the copolymer proportion of the (b3) compound having one cyclic ether unit per molecule is too small, the copolymerization reaction may become unstable, and in addition, the thermal stability of the produced polyacetal copolymer may become inferior, and to the contrary, if the copolymer proportion of the (b3) compound having one cyclic ether unit per molecule is too large, the mechanical characteristics such as the rigidity, strength and the like of the plate-shaped resin molded article may decrease and be insufficient.

[(C) Hindered Phenol-Based Antioxidant]

The polyacetal resin composition of the present invention comprises a (C) hindered phenol-based antioxidant. The (C) hindered phenol-based antioxidant is not particularly limited, and for example, monocyclic hindered phenol compounds (for example, 2,6-di-t-butyl-p-cresol and the like), polycyclic hindered phenol compounds connected by a group comprising a hydrocarbon group or a sulfur atom (for example, 2,2'-methylenebis(4-methyl-6-t-butylphenol), 4,4'-methylenebis(2,6-di-t-butylphenol), 1,1,3-tris(2-methyl-4-hydroxy-5-t-butylphenyl)butane, 4,4'-butylidenebis(3-methyl-6-t-butylphenol), 1,3,5-trimethyl-2,4,6-tris(3,5-di-t-butyl-4-hydroxybenzyl)benzene, 4,4'-thiobis(3-methyl-6-t-butylphenol) and the like), hindered phenol compounds having an ester group or an amide group (for example, n-octadecyl-3-(4'-hydroxy-3',5'-di-t-butylphenyl)propionate, n-octadecyl-2-(4'-hydroxy-3',5'-di-t-butylphenyl)propionate, 1,6-hexanediol-bis[3-(3,5-di-t-butyl-4-hydroxyphenyl)propionate], triethylene glycol-bis[3-(3-t-butyl-5-methyl-4-hydroxyphenyl)propionate], pentaerythritol tetrakis[3-(3,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxyspiro[5.5]undecane, 2-t-butyl-6-(3'-t-butyl-5'-methyl-2'-hydroxybenzyl)-4-methylphenylacrylate, 2-[1-(2-hydroxy-3,5-di-t-pentylphenyl]ethyl]-4,6-di-t-pentylphenylacrylate, di-n-octadecyl-3,5-di-t-butyl-4-hydroxybenzylphosphonate, N,N'-hexamethylenebis(3,5-di-t-butyl-4-hydroxy-dihydrocinnamide, N,N'-ethylenebis[3-(3,5-di-t-butyl-4-hydroxyphenyl)propionamide], N,N'-tetramethylenebis[3-(3,5-di-t-butyl-4-hydroxyphenyl)propionamide], N,N'-hexamethylenebis[3-(3,5-di-t-butyl-4-hydroxyphenyl)propionamide], N,N'-ethylenebis[3-(3-t-butyl-5-methyl-4-hydroxyphenyl)propionamide], N,N'-hexamethylenebis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris(3,5-di-t-butyl-4-hydroxybenzyl)isocyanate, 1,3,5-tris(4-t-butyl-3-hydroxy-2,6-dimethylbenzyl)isocyanate, and the like may be mentioned as examples.

In particular, as the (C) hindered phenol-based antioxidant, from the point of an excellent antioxidation effect of the polyacetal resin composition, triethylene glycol bis[3-(3-t-butyl-5-methyl-4-hydroxyphenyl)propionate], and pentaerythritol tetrakis[3-(3,5-di-t-butyl-4-hydroxyphenyl)propionate] are preferable. In particular, from the point of excellent color stability when remaining in the molding machine, triethylene glycol bis[3-(3-t-butyl-5-methyl-4-hydroxyphenyl)propionate] is preferable.

The content of the (B) hindered phenol-based antioxidant is 0.1 parts by mass to 1 part by mass with respect to 100 parts by mass of the (A) polyacetal resin, preferably 0.2 parts by mass to 0.5 parts by mass. If the content of the (B) hindered phenol-based antioxidant is too small, this is undesirable because the effect of the antioxidant is insufficient. If the content of the (B) hindered phenol-based antioxidant is too large, this is not only uneconomical, but this may also be a cause of a loss of some of the mechanical properties of the plate-shaped molded article obtained from the resin composition.

[(D) Other Additives]

The polyacetal resin composition of the present invention, as an additional component, may further comprise a costabilizer, lubricating agent, anti-acid agent, impact modifier, luster control agent, slide characteristic improving agent, filler, coloring agent, mold releasing agent, antistatic agent, surfactant, antimicrobial agent, antifungal agent, fragrance, foaming agent, compatibilizer, physical property improving agent (boric acid or a derivative thereof or the like), aroma, or the like.

[Costabilizer]

As the costabilizer, melamine, guanamine compounds such as aliphatic guanamine-based compounds, alicyclic guanamine-based compounds, aromatic guanamine-based compounds (benzoguanamine and the like), guanamine-based compounds comprising heteroatoms (CTU-guanamine) and the like, or hydrazide compounds or the like, may be mentioned.

[Lubricating Agent]

As the lubricating agent, long chain fatty acid amides and the like may be mentioned, and acid amides (monoamides, bisamides and the like) of long chain fatty acids (monovalent or divalent long chain fatty acid) and amines (monoamines, diamines, polyamines and the like) may be used. As the monoamide, for example, primary acid amides of saturated fatty acids such as capric acid amide, lauric acid amide, myristic acid amide, palmitic acid amide, stearic acid amide, arachic acid amide, behenic acid amide, montanoic acid amide and the like, primary acid amides of unsaturated fatty acids such as oleic acid amide and the like, and secondary acid amides of saturated and/or unsaturated fatty acids and monoamine such as stearylstearamide, stearyloleamide and the like, and the like may be mentioned. Further, bisamide includes bisamide of the above-mentioned fatty acids and C1 to 6 alkylene diamines (in particular C1 to 2 alkylene diamines), and the like and as specific examples thereof, ethylenediamine-dipalmitic acid amide, ethylenediamine-distearic acid amide (ethylene bisstearyl amide), hexamethylenediamine-dibehenic acid amide, ethylenediamine-dimontanoic acid amide, ethylenediamine-dioleic acid amide, ethylenediamine-dierucic acid amide and the like may be mentioned, and further, bisamides having a structure wherein an amine portion unit of an alkylene diamde is bonded to a different acyl group such as ethylenediamine-(stearic acid amide)oleic acid amide and the like, and the like may be used. A preferable fatty acid amide is bisamide.

[Anti-Acid Agent]

As the anti-acid agent, an organic carboxylic acid metal salt may be mentioned. As the organic carboxylic acid forming the organic carboxylic acid metal salt, any kind of aliphatic carboxylic acid with a carbon number on the order of 1 to 34 may be used, and saturated aliphatic monocarboxylic acids, saturated aliphatic dicarboxylic acids, unsaturated aliphatic monocarboxylic acids, unsaturated aliphatic dicarboxylic acids, and oxyacids thereof and the like may be mentioned. These aliphatic carboxylic acids may also be ones having a hydroxyl group. Further, they may also be copolymers or the like of polymerizable unsaturated carboxylic acid ((meth)acrylic acid, maleic acid, fumaric acid, anhydrous maleic acid, malec acid monoethyl and the like) and olefins. As specific examples of the organic carboxylic acid metal salt, alkali metal organic carboxylic acid salts such as lithium citrate, potassium citrate, sodium citrate, lithium stearate, lithium 12-hydroxystearate and the like, alkali earth metal organic carboxylic acids such as magnesium acetate, calcium acetate, magnesium citrate, calcium citrate, calcium stearate, magnesium stearate, magnesium 12-hydroxystearate, calcium 12-hydroxystearate and the like, ionomer resins and the like. Among these organic carboxylic acid metal salts, alkali earth metal salts such as calcium citrate, magnesium stearate, calcium stearate, magnesium 12-hydroxystearate, calcium 12-hydroxystearate and the like, and ionomer resins are preferable.

[Preparation of the Polyacetal Resin Composition]

The preparation of the polyacetal resin composition can be easily carried out by a well-known method which is generally used as a resin composition preparation method of the prior art. For example, after mixing all of the components, kneading and extruding by an extruder to obtain pellets.

[Shrinkage Ratio Anisotropy (Dimensional Stability)]

The polyacetal resin composition of the present invention is excellent in shrinkage ratio anisotropy (dimensional stability) when made into a resin molded article. Specifically, when the polyacetal resin composition of the present invention is injection molded into a molded product of 120 mm×120 mm×2 mm under conditions of a cylinder temperature of 200° C., mold temperature of 80° C., holding pressure of 60 MPa, and injection rate of 16.7 mm/s, the polyacetal resin composition of the present invention provides a plate-shaped molded article whose the anisotropy of the shrinkage factor stipulated as the absolute value of difference between the shrinkage factor in the flow direction of the resin composition and the shrinkage factor in a direction perpendicular to the flow direction of the resin composition is 0.1% or less.

The measurement of the shrinkage factor of the resin molded article is calculated from the following formula, using an optical measurement device made by Mitsutoyo Corporation (Quick Visiaon Pro), after keeping for 24 hours under an environment of 23° C., and 50% RH.

shrinkage factor (%)=((mold dimension−molded article dimension)/mold dimension)×100

The resin molded article of the present invention is a plate-shaped molded article consisting of the above described polyacetal resin composition, and therefore, the anisotropy of the shrinkage factor is an extremely small value of 0.1% or less, and the dimensional stability is excellent.

[Flatness of the Resin Molded Article]

The polyacetal resin composition of the present embodiment has excellent flatness when made into a resin molded article. Specifically, the polyacetal resin composition of the present embodiment provides a plate-shaped molded article of whom the degree of flatness is 1.5 mm or less.

(Method of Measuring the Degree of Flatness)

In the present embodiment, the degree of flatness is measured by the below measurement method.

Figure 1:
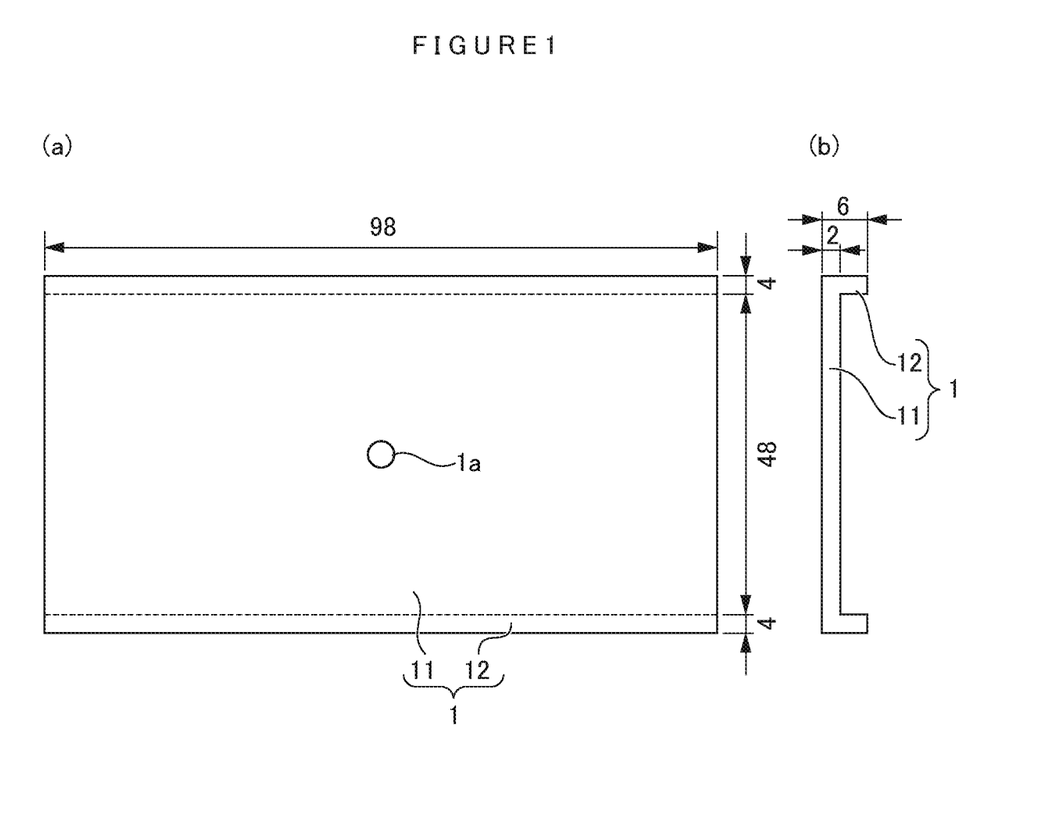
FIG. 1 is a figure explaining the shape of the plate-shaped molded article when measuring the flatness, and (a) is a plan view of the plate-shaped molded article, and (b) is a side view of the plate-shaped molded article.

(I) A plate-shaped molded article 1 is obtained by injection molding the polyacetal resin composition under conditions of a cylinder temperature of 200° C., mold temperature of 80° C., holding pressure 50 MPa, injection rate 30 mm/s, one point center pin gate, as shown in FIG. 1 having a flat plate portion 11 and a rib portion 12, a length of the long side of the flat plate portion 11 is 98 mm, a length of the short side of the flat plate portion 11 is 48 mm, a thickness of the flat plate portion 11 is 2 mm, a rib thickness of the rib portion 12 is 4 mm, and the rib height of the rib portion 12 is 6 mm.

(II) For the plate-shaped molded article 1 obtained in (I), 4 locations each 5 mm away in the long side direction and the short side direction from the four corners of the flat plate portion 11 towards the inner side of the flat plate portion 11 are taken as end points.

(III) From the four end points, a total of 35 locations are set as measurement positions, by selecting 7 locations in the long side direction of the flat plate portion 11 and 5 locations in the short side direction of the flat plate portion 11 such that the distances between each point are evenly spaced.

Figure 2:
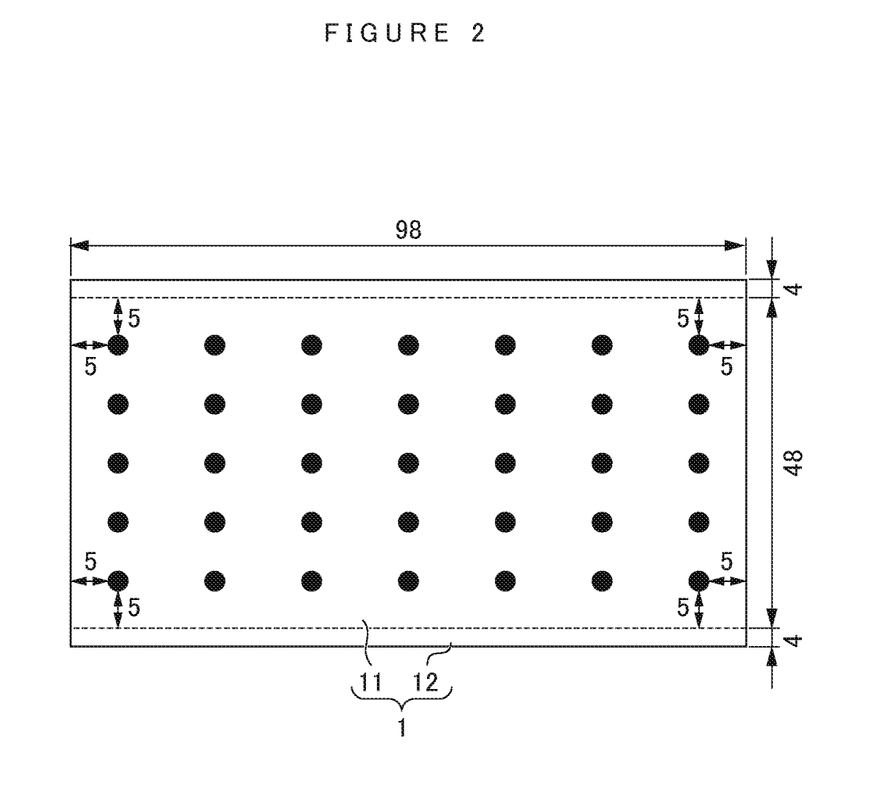
FIG. 2 is a schematic view showing the measurement locations of the plate-shaped molded article.

(IV) For each of the 35 locations of the measurement positions, the degree of deviation from the base surface of the flat plate portion 11 was measured using an optical measurement device made by Mitsutoyo Corporation (Quick Visiaon Pro), and the magnitude of the difference between the greatest positive deviation point and the greatest negative deviation point was taken as the flatness. Further, in FIG. 1 and FIG. 2, the units of the numbers are [mm]. In FIG. 2, black circles show measurement positions.

The resin molded article of the present invention is a plate-shaped molded article consisting of the above described polyacetal resin composition, and therefore, it has excellent flatness with a degree of flatness of 1.5 mm or less.

[Creep Resistance of the Resin Molded Article]

The polyacetal resin composition of the present embodiment has excellent creep resistance when made into a resin molded article. Specifically, by using the polyacetal resin composition of the present embodiment, it is possible to obtain a plate-shaped molded article with a creep resistance of 1000 hours or more measured according to the below measurement method.

(Method of Measuring the Creep Resistance)

Using an injection molding machine, a tensile test piece according to ISO 20753 (Type 1A) was molded from the pellets of the examples and comparative examples, under conditions of cylinder temperature: 205° C., mold temperature: 90° C. This tensile test piece was hung in air at 80° C. under a tensile stress of 20 MPa, and the time (lifetime) until breakage occurred was measured.

The resin molded article of the present invention is a plate-shaped molded article consisting of the above described polyacetal resin composition, and therefore, it has excellent creep strength where the above described time is 1000 hours or more.

[Impact Strength of the Resin Molded Article]

The polyacetal resin composition of the present embodiment has excellent impact strength when made into a resin molded article. Specifically, by using the polyacetal resin composition of the present embodiment, it is possible to obtain a plate-shaped molded article with an impact strength of 9.0 kJ/m$^2$ or more measured according to the below measurement method.

(Measurement Method of the Impact Strength)

Using an injection molding machine, a notched Charpy test piece according to ISO 179/IeA was molded from the pellets of the examples and comparative examples, under conditions of cylinder temperature: 205° C., mold temperature: 90° C. Then, the Charpy impact test value at 23° C. according to ISO 179/IeA was measured.

The resin molded article of the present invention is a plate-shaped molded article consisting of the above described polyacetal resin composition, and therefore, it has excellent impact strength where the above described Charpy impact strength is 9.0 kJ/m$^2$ or more.

[Color Stability (Degree of Discoloration after Melt Retention (ΔE)) when Retained Inside Molding Machine]

The polyacetal resin composition of the present embodiment has excellent color stability when made into a resin molded article. Specifically, by using the polyacetal resin composition of the present embodiment, it is possible to obtain a resin molded article with a degree of discoloration (ΔE) after melt retention of 1.5 or less, preferably 1.0 or less, more preferably 0.5 or less, measured according to the below measurement method.

(Measurement Method of Degree of Discoloration after Melt Retention (ΔE))

The hue (L, a, b) of a molded article (using the above described Charpy test piece) molded under the below described variable molding conditions was measured using a color sensor Z300A (manufactured by Nippon Denshoku Industries Co., Ltd.) After this, the degree of discoloration after melt retention (ΔE)) was calculated.

(Variable Molding Conditions)
molding condition 1: molding with a 40 sec mold cycle without retaining molten resin inside cylinder.
molding condition 2: molding after retaining the molten resin for 30 min inside cylinder.
(Calculation of the Degree of Discoloration after Melt Retention ($\Delta E$))

The degree of discoloration after melt retention ($\Delta E$) is calculated using the following formula.

$$\Delta E=\{(L_1-L_0)^2+(a_1-a_0)^2+(b_1-b_0)^2\}^{1/2}$$

Here, $L_1$, $a_1$, and $b_1$ are hues of the molded article of the molding condition 2 (after retaining the molten resin for 30 min), and $L_0$, $a_0$, and $b_0$ are hues of the molded article of the molding condition 1.

The resin molded article of the present invention is a plate-shaped molded article consisting of the above described polyacetal resin composition, and therefore, it has excellent color stability after retaining in the molding machine with a degree of discoloration after melt retention ($\Delta E$) of 1.5 or less, preferably 1.0 or less, more preferably 0.5 or less.

<Plate-Shaped Molded Article>
[Application and the Like]

The polyacetal resin composition of the present invention is excellent in flatness and low shrinkage ratio anisotropy (dimensional stability), and therefore, is suitable for application to a plate-shaped molded article. The application of the plate-shaped molded article is not particularly limited, and it may be applied to an automobile component, electric•electronic component, building material, and the like. As an automobile component, a carrier plate of a window regulator, or a panel for an automobile such as an installment panel, door trim, trunk board or the like may be mentioned. Further, as an electric•electronic component, a chassis, tray, side plate, a component for office automation equipment represented by printer or copier, or the like; a component for a camera or video device represented by a video movie, digital video camera, camera, and digital camera; music, image, or information devices represented by cassette players, DAT, LD (Laser Disk), MD (Mini Disk), CD (Compact Disk), DVD (Digital Video Disk), Blu-Ray (registered trademark) Disk, HD-DVD, and other optical disks, MFD, MO, navigation systems, and mobile personal computers, and components for transmission devices represented by mobile telephones and facsimile machines may be mentioned. As building materials, panels for homes, flooring materials and the like may be mentioned.

A window regulator is constituted by comprising a carrier panel which sandwiches a window glass, and a guide rail which extends in a raising and lowering (up and down) direction, and which moves the carrier plate in the raising and lowering (up and down) direction by the operation of a motor. Therefore, the carrier plate must be accommodated in a limited space between the door outer panel and the door inner panel without interference with other components, and further greatly contributes to the positional accuracy of the window glass. Accordingly, the resin molded article of the present invention is particularly suitable for a carrier plate of a window regulator which further requires excellent flatness, shrinkage ratio anisotropy (dimensional stability), creep resistance, impact strength, and color stability during retention in the molding machine.

[Method of Producing the Plate-Shaped Molded Article]

The plate-shaped molded article of the present embodiment is made by molding the above described polyacetal resin composition by a general molding method. As a general molding method, an injection molding method, extrusion molding method, blow molding method and the like may be mentioned. The molding conditions and molding method are appropriately set depending on the properties of the material and the form of the molded article.

EXAMPLES

Below, examples of the present invention are specifically explained, but the present invention is not limited by these examples.

<Production of the Test Specimens>
[Preparation of the (A) Polyacetal Resin]
(A1) Polyacetal Resin with a Melt Index (MI) of 2.5 g/10 Min A continuous biaxial polymerization machine was used as the polymerization reaction device. The outside of the polymerization device is equipped with a jacket for passing a medium for heating or cooling, and inside two rotating shafts equipped with a plurality of paddles for stirring and propelling are provided. A heating medium at 80° C. is passed through the jacket of this biaxial polymerization device, and while the two shafts are made to rotate at a constant speed, and at one end thereof, as a chain transfer agent, 350 ppm methylal is continuously supplied, and as a comonomer with respect to trioxane, 1,3-dioxolane is added at 3.3 mass % in the total monomer (trioxane+comonomer), and to this mixed liquid, boron trifluoride is continuously added at 20 ppm, and the copolymerization was carried out. After this, the crude polyacetal copolymer is discharged from the discharge opening provided at the other end of the polymerization device. While the discharged reaction product is promptly passed through a shredder, it is added to an aqueous solution comprising 0.05 mass % triethylamine at 60° C. to deactivate the catalyst. Further, by separating, washing and drying, the crude polyacetal copolymer was obtained. Next, 3 mass % of an aqueous solution of 5 mass % triethylamine was added to 100 parts by mass of this crude polyacetal copolymer, and by melt kneading in a biaxial extruder at 210° C. the unstable portions were eliminated, and the polyacetal resin was obtained. Using a melt index measurement device: Melt Indexer L202 type (made by Takara Thermistor), as a result of measuring under conditions of a load of 2.16 kg, temperature of 190° C., the melt index (MI) was 2.5 g/10 min.

(A2) Polyacetal Resin with a Melt Index (MI) of 3.5 g/10 Min

Other than that the added amount of methylal as a chain transfer agent was changed to 400 ppm, the polyacetal resin was obtained by the same method as the preparation of the (A) polyacetal resin. The melt index measured by the same method as above was 3.5 g/10 min.

(A3) Polyacetal Resin with a Melt Index (MI) of 1.5 g/10 Min

Other than that the added amount of methylal as a chain transfer agent was changed to 150 ppm, the polyacetal resin was obtained by the same method as the preparation of the (A) polyacetal resin. The melt index measured by the same method as above was 1.5 g/10 min.

(A4) Polyacetal Resin with a Melt Index (MI) of 9.0 g/10 Min

Other than that the added amount of methylal as a chain transfer agent was changed to 700 ppm, the polyacetal resin was obtained by the same method as the preparation of the (A) polyacetal resin. The melt index measured by the same method as above was 9.0 g/10 min.

[(B) Preparation of the Specified Nucleating Agent]
(B1) Copolymer of Compound Having 2 Cyclic Ether Units A branched or crosslinked polyacetal copolymer (B1) as a nucleating agent was obtained by the copolymerization of a compound having 2 cyclic ether units per one molecule in the same method as for the [(A) preparation of the polyacetal resin], other than the composition of the raw materials was (b1) 96.6 parts by mass of trioxane, (b2) 0.1 part by mass of butanediol diglycidyl ether, and (b3) 3.3 parts by mass 1,3-dioxolane (without adding methylal).

(B2) Copolymer of Compound Having 3 Cyclic Ether Units

A branched or crosslinked polyacetal copolymer (B2) as a nucleating agent was obtained by the copolymerization of a compound having 3 cyclic ether units per one molecule in the same method as for the [(A) preparation of the polyacetal resin], other than the composition of the raw materials was (b1) 98.8 parts by mass of trioxane, (b2) 0.1 part by mass of trimethylolpropane triglycidyl ether, and (b3) 1.1 parts by mass 1,3-dioxolane (without adding methylal).

(B3) Copolymer of Compound Having 4 Cyclic Ether Units

A branched or crosslinked polyacetal copolymer (B2) as a nucleating agent was obtained by the copolymerization of a compound having 4 cyclic ether units per one molecule in the same method as for the [(A) preparation of the polyacetal resin], other than the composition of the raw materials was (b1) 98.8 parts by mass of trioxane, (b2) 0.1 part by mass of trimethylolpropane triglycidyl ether, and (b3) 1.1 parts by mass 1,3-dioxolane (without adding methylal).

[(C) Hindered Phenol-Based Antioxidant]

(C1) pentaerythritol tetrakis[3-(3,5-di-t-butyl-4-hydroxyphenyl)propionate] (product name: IRGANOX 1010, manufactured by BASF Japan Ltd.)

(C2) triethylene glycol bis[3-(3-t-butyl-5-methyl-4-hydroxyphenyl)propionate] (product name: IRGANOX 245, manufactured by BASF Japan Ltd.)

[Preparation of the Polyacetal Resin Composition]

To the above described (A) polyacetal resin, the (B) nucleating agent, and (C) hindered phenol-based antioxidant were added and mixed in the proportions shown in Table 1, and the resin composition of the examples and comparative examples was prepared in pellet form by melt-kneading in a biaxial extruder.

TABLE 1

| | | Example | | | | | Comparative example | | |
|---|---|---|---|---|---|---|---|---|---|
| Function | | 1 | 2 | 3 | 4 | 5 | 1 | 2 | 3 |
| polyacetal resin | (A1) MI: 2.5 g/10 min | 100 | 100 | 100 | — | 100 | 100 | — | — |
| | (A2) MI: 3.5 g/10 min | — | — | — | 100 | — | — | — | — |
| | (A3) MI: 1.5 g/10 min | — | — | — | — | — | — | 100 | — |
| | (A4) MI: 9.0 g/10 min | — | — | — | — | — | — | — | 100 |
| nucleating agent | (B1) cyclic ether units: 2 | 0.75 | 0.75 | — | — | — | — | 0.75 | 0.75 |
| | (B2) cyclic ether units: 3 | — | — | 0.75 | 0.75 | — | — | — | — |
| | (B3) cyclic ether units: 4 | — | — | — | — | 0.75 | — | — | — |
| antioxidant | (C1) | — | 0.30 | — | — | — | 0.30 | 0.30 | 0.30 |
| | (C2) | 0.30 | — | 0.30 | 0.30 | 0.30 | — | — | — |

(The units of the table are parts by mass.)

[Production of the Test Specimens]

Next, with an injection molding machine using these pellets, various molded articles suitable for respectively evaluating the shrinkage ratio anisotropy (dimensional stability), flatness, creep resistance, impact strength, and color stability during residence in the molding machine were injection molded according to the above described molding conditions.

<Evaluation>

The test specimens (plate-shaped molded articles) obtained according to the above described <production of the test specimens> were evaluated for shrinkage ratio anisotropy (dimensional stability), flatness, creep resistance, impact strength, and color stability during residence in the mold machine according to the methods as described above. The results thereof are shown in Table 2. Further, in Table 2, the evaluation of the creep resistance was set as o when the tensile creep stress life was 1000 hours or more, and was set as x when less than 1000 hours.

TABLE 2

| | | Example | | | | | Comparative example | | |
|---|---|---|---|---|---|---|---|---|---|
| Evaluation | | 1 | 2 | 3 | 4 | 5 | 1 | 2 | 3 |
| shrinkage ratio anisotropy | flowability [%] | 2.24 | 2.23 | 2.21 | 2.21 | 2.20 | 2.41 | 2.61 | 1.86 |
| | perpendicular [%] | 2.27 | 2.29 | 2.23 | 2.24 | 2.24 | 2.15 | 2.40 | 1.92 |
| | anisotropy [%] | 0.03 | 0.06 | 0.02 | 0.03 | 0.04 | 0.26 | 0.21 | 0.06 |
| flatness | degree of flatness [mm] | 1.3 | 1.3 | 1.2 | 1.2 | 1.2 | 1.9 | 1.6 | 1.2 |
| creep resistance | tensile creep stress life | o | o | o | o | o | x | o | x |
| impact strength | Charpy rupture strength [kJ/m$^2$] | 10.2 | 10.2 | 10.0 | 9.8 | 10.1 | 11.2 | 10.5 | 6.7 |
| color stability | ΔE | 0.5 | 2.0 | 0.5 | 0.5 | 0.5 | 2.0 | 2.0 | 2.0 |

From the results in Table 2, it can be understood that a resin molded article (Examples 1 to 5) consisting of a polyacetal resin composition comprising, with respect to (A) a polyacetal resin, predetermined amounts of (B) a nucleating agent of a polyacetal copolymer having a branched or crosslinked structure, and (C) a hindered phenol-based antioxidant, has excellent shrinkage ratio anisotropy (dimensional stability), flatness, and creep resistance compared to Comparative Example 1 which does not comprise the nucleating agent specified in (B). Further, from the results of Comparative Example 2, it can be understood that in the case that the melt index of the polyacetal resin which is the base is lower than the stipulated range, even if the specified nucleating agent is included, the shrinkage ratio anisotropy (dimensional stability) and flatness will deteriorate. From the results of Comparative Example 3, it can be understood that in the case that the melt index of the polyacetal resin which is the base is higher than the stipulated range, even if the specified nucleating agent is included, the creep resistance and impact strength will deteriorate. Furthermore, it can be understood that Examples 1, 3, 4, and 5 which comprise ethylenebis(oxyethylene)bis[3-(3-t-butyl-4-hydroxy-5-methylphenyl)propionic acid] as the antioxidant, show particularly excellent color stability during residence in the molding machine.

EXPLANATION OF REFERENCE NUMERALS 1 plate-shaped molded article
11 flat plate portion
12 rib portion

The invention claimed is:

1. A polyacetal resin composition for molding a plate-shaped molded article, comprising:
 (A) 100 parts by mass of a polyacetal resin having a melt index (in conformity with ASTM-D1238, 190° C., 2.16 kgf) of 2.0 g/10 min to 4.0 g/10 min;
 (B) 0.1 parts by mass to 2 parts by mass of a polyacetal copolymer having a branched or crosslinked structure, which is a copolymer of (b1) trioxane, (b2) a compound having 2 cyclic ether units per one molecule, and (b3) a compound having one cyclic ether unit per one molecule; and
 (C) 0.1 parts by mass to 1 part by mass of a hindered phenol-based antioxidant.

2. The polyacetal resin composition according to claim 1, wherein the (C) hindered phenol-based antioxidant comprises triethylene glycol bis[3-(3-t-butyl-5-methyl-4-hydroxyphenyl)propionate].

3. The polyacetal resin composition according to claim 1, wherein a flatness measured according to the measurement method below is 1.5 mm or less:
 (I) a plate-shaped molded article is obtained by injection molding of the polyacetal resin composition under conditions of a cylinder temperature of 200° C., mold temperature of 80° C., holding pressure 50 MPa, injection rate 30 mm/s, one point center pin gate, having a flat plate portion and a rib portion, a length of the long side of the flat plate portion is 98 mm, a length of the short side of the flat plate portion is 48 mm, a thickness of the flat plate portion is 2 mm, a rib thickness of the rib portion is 4 mm, and the rib height of the rib portion is 6 mm;
 (II) for the plate-shaped molded article obtained in (I), 4 locations each 5 mm away in the long side direction and the short side direction from the four corners of the flat plate portion towards the inner side of the flat plate portion are taken as end points;
 (III) from the end points of the 4 locations, a total of 35 locations are set as measurement positions, by selecting 7 locations in the long side direction of the flat plate portion and 5 locations in the short side direction of the flat plate portion such that the distances between each point are evenly spaced;
 (IV) for each of the 35 locations of the measurement positions, the degree of deviation from the base surface of the flat plate portion was measured using an image measuring device, and the magnitude of the difference between the greatest positive deviation point and the greatest negative deviation point was taken as the flatness.

4. A plate-shaped molded article consisting of the polyacetal resin composition according to claim 1.

5. A carrier plate of a window regulator, comprising the plate-shaped molded article according to claim 4.

6. The polyacetal resin composition according to claim 2, wherein a flatness measured according to the measurement method below is 1.5 mm or less:
 (I) a plate-shaped molded article is obtained by injection molding of the polyacetal resin composition under conditions of a cylinder temperature of 200° C., mold temperature of 80° C., holding pressure 50 MPa, injection rate 30 mm/s, one point center pin gate, having a flat plate portion and a rib portion, a length of the long side of the flat plate portion is 98 mm, a length of the short side of the flat plate portion is 48 mm, a thickness of the flat plate portion is 2 mm, a rib thickness of the rib portion is 4 mm, and the rib height of the rib portion is 6 mm;
 (II) for the plate-shaped molded article obtained in (I), 4 locations each 5 mm away in the long side direction and the short side direction from the four corners of the flat plate portion towards the inner side of the flat plate portion are taken as end points;
 (III) from the end points of the 4 locations, a total of 35 locations are set as measurement positions, by selecting 7 locations in the long side direction of the flat plate portion and 5 locations in the short side direction of the flat plate portion such that the distances between each point are evenly spaced;
 (IV) for each of the 35 locations of the measurement positions, the degree of deviation from the base surface of the flat plate portion was measured using an image measuring device, and the magnitude of the difference between the greatest positive deviation point and the greatest negative deviation point was taken as the flatness.

7. A plate-shaped molded article consisting of the polyacetal resin composition according to claim 2.

8. A plate-shaped molded article consisting of the polyacetal resin composition according to claim 3.

9. A carrier plate of a window regulator, comprising the plate-shaped molded article according to claim 7.

10. A carrier plate of a window regulator, comprising the plate-shaped molded article according to claim 8.

* * * * *